US012657219B2

(12) United States Patent
Mishima et al.

(10) Patent No.: US 12,657,219 B2
(45) Date of Patent: Jun. 16, 2026

(54) INFORMATION PROCESSING DEVICE, COMPUTER PROGRAM PRODUCT, AND INFORMATION PROCESSING METHOD

(71) Applicant: KABUSHIKI KAISHA TOSHIBA, Tokyo (JP)

(72) Inventors: Nao Mishima, Tokyo (JP); Reiko Noda, Kawasaki (JP); Tatsuo Kozakaya, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 138 days.

(21) Appl. No.: 18/586,639

(22) Filed: Feb. 26, 2024

(65) Prior Publication Data

US 2024/0403337 A1 Dec. 5, 2024

(30) Foreign Application Priority Data

May 31, 2023 (JP) ................................. 2023-089841

(51) Int. Cl.
*G06F 16/3329* (2025.01)
*G06F 16/583* (2019.01)
*G06V 10/25* (2022.01)
(52) U.S. Cl.
CPC ...... *G06F 16/3329* (2019.01); *G06F 16/5846* (2019.01); *G06V 10/25* (2022.01)
(58) Field of Classification Search
CPC .. G06F 16/3329; G06F 16/5846; G06V 10/25
See application file for complete search history.

(56) References Cited

U.S. PATENT DOCUMENTS

2008/0030488 A1* 2/2008 Kobayashi .......... G06F 3/04892
                                                      345/204
2022/0067081 A1 3/2022 Saito et al.
2022/0129693 A1* 4/2022 Pham ..................... G06V 30/40
2022/0383037 A1* 12/2022 Pham ..................... G06N 3/045
(Continued)

FOREIGN PATENT DOCUMENTS

JP 2022038941 A 3/2022
JP 2022071675 A 5/2022
(Continued)

OTHER PUBLICATIONS

Radford, et al., "Learning Transferable Visual Models From Natural Language Supervision", ICML2021, 2021.
(Continued)

*Primary Examiner* — Richemond Dorvil
*Assistant Examiner* — Adam Michael Weaver
(74) *Attorney, Agent, or Firm* — Holtz, Holtz & Volek PC

(57) ABSTRACT

According to one embodiment, an information processing device includes a memory and one or more processors coupled to the memory. The one or more processors are configured to: receive input of a prompt including a first text and an expected value of an answer related to the first text; predict, upon input of the first text and at least one image, the answer for each of the at least one image by using an AI model that outputs the answer; compute accuracy of the answer from the expected value and the answer; and display, on a display device, display information including at least the prompt, the answer, and the accuracy.

15 Claims, 22 Drawing Sheets

(56)        References Cited

U.S. PATENT DOCUMENTS

| | | | |
|---|---|---|---|
| 2023/0077031 A1* | 3/2023 | Hosoya | G06F 16/53 |
| 2023/0252344 A1* | 8/2023 | Mishima | G06N 3/0455 |
| | | | 706/12 |
| 2023/0419652 A1* | 12/2023 | Tiong | G06N 3/045 |
| 2024/0119257 A1* | 4/2024 | Guo | G06F 16/583 |
| 2024/0193200 A1 | 6/2024 | Watanabe et al. | |
| 2024/0242487 A1 | 7/2024 | Conde et al. | |

FOREIGN PATENT DOCUMENTS

| | | | |
|---|---|---|---|
| JP | 2022190985 A | 12/2022 | |
| JP | 2023039656 A | 3/2023 | |
| JP | 2023117248 A | 8/2023 | |
| JP | 2024074523 A | 5/2024 | |
| JP | 2024521118 A | 5/2024 | |
| JP | 2024082634 A | 6/2024 | |

OTHER PUBLICATIONS

Selvaraju, et al., "Grad-CAM: Visual Explanations from Deep Networks via Gradient-based Localization", ICCV2017, 2017.
Japanese Office Action (and an English language translation thereof) dated Mar. 3, 2026, issued in corresponding Japanese Application No. 2023-089841.
"What is ChatGPT?", [Online], Windows Forest, Mar. 15, 2023, <Retrieved from the Internet, URL: https://forest.watch.impress.co.jp/docs/review/1499657.html>.

* cited by examiner

FIG.1

Does the person play with the phone while walking?, ['yes'], acc=0.58

Positive acc=1.00: yes (0.68)  yes (0.55)  yes (0.61)  yes (0.52)  yes (0.55)  yes (0.64)

Negative acc=0.17: yes (0.61)  yes (0.60)  yes (0.44)  yes (0.58)  yes (0.51)  no (0.50)

Is the person texting while walking?, ['yes'], acc=1.00

Positive acc=1.00: yes (0.60)  yes (0.54)  yes (0.54)  yes (0.53)  yes (0.62)  yes (0.63)

Negative acc=1.00: no (0.83)  no (0.89)  no (0.96)  no (0.87)  no (0.96)  no (0.80)

QUESTION 1
Is the person texting
while walking?

QUESTION 2
Does the person play
with the phone while walking?

SUGGESTION
Is the person texting
while walking?

QUESTION
Does the person play
with the phone while walking?

Figure 18:
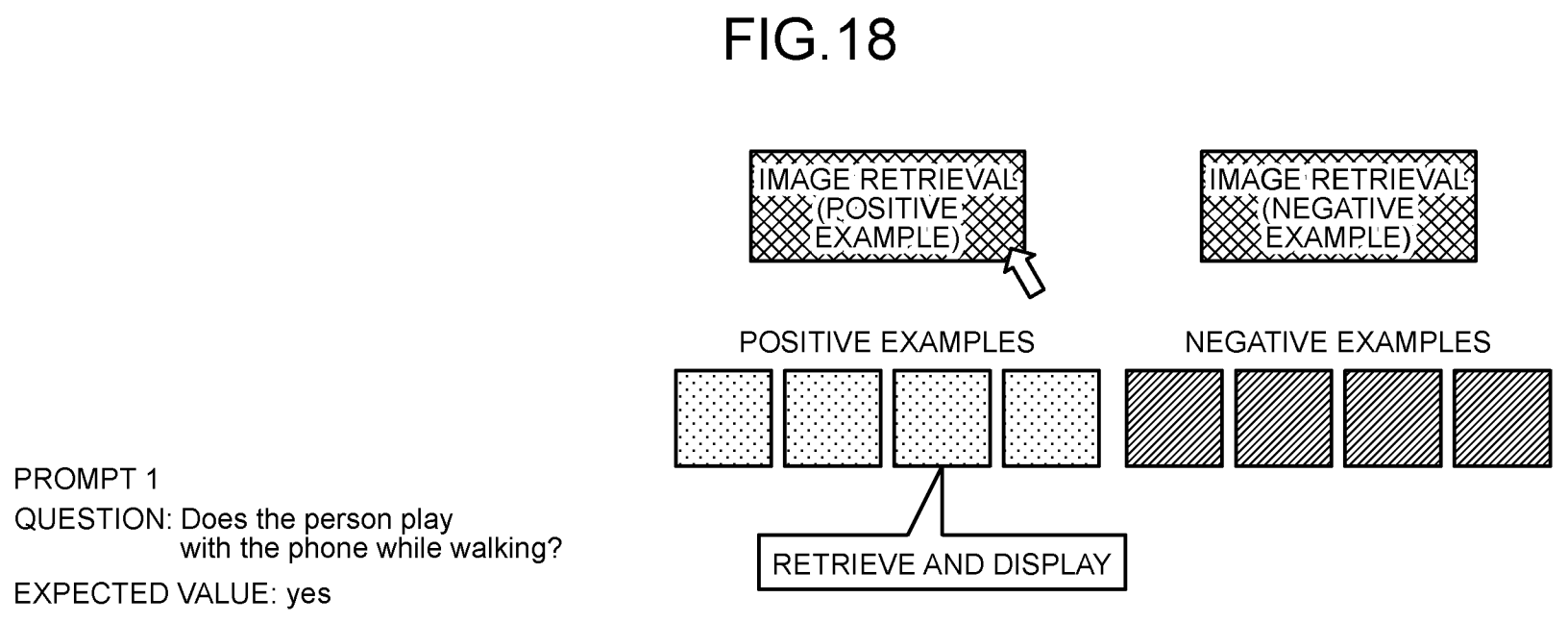

IMAGE RETRIEVAL (NEGATIVE EXAMPLE)

NEGATIVE EXAMPLES

IMAGE RETRIEVAL (POSITIVE EXAMPLE)

POSITIVE EXAMPLES

RETRIEVE AND DISPLAY

PROMPT 1

QUESTION: Does the person play with the phone while walking?

EXPECTED VALUE: yes

FIG.19

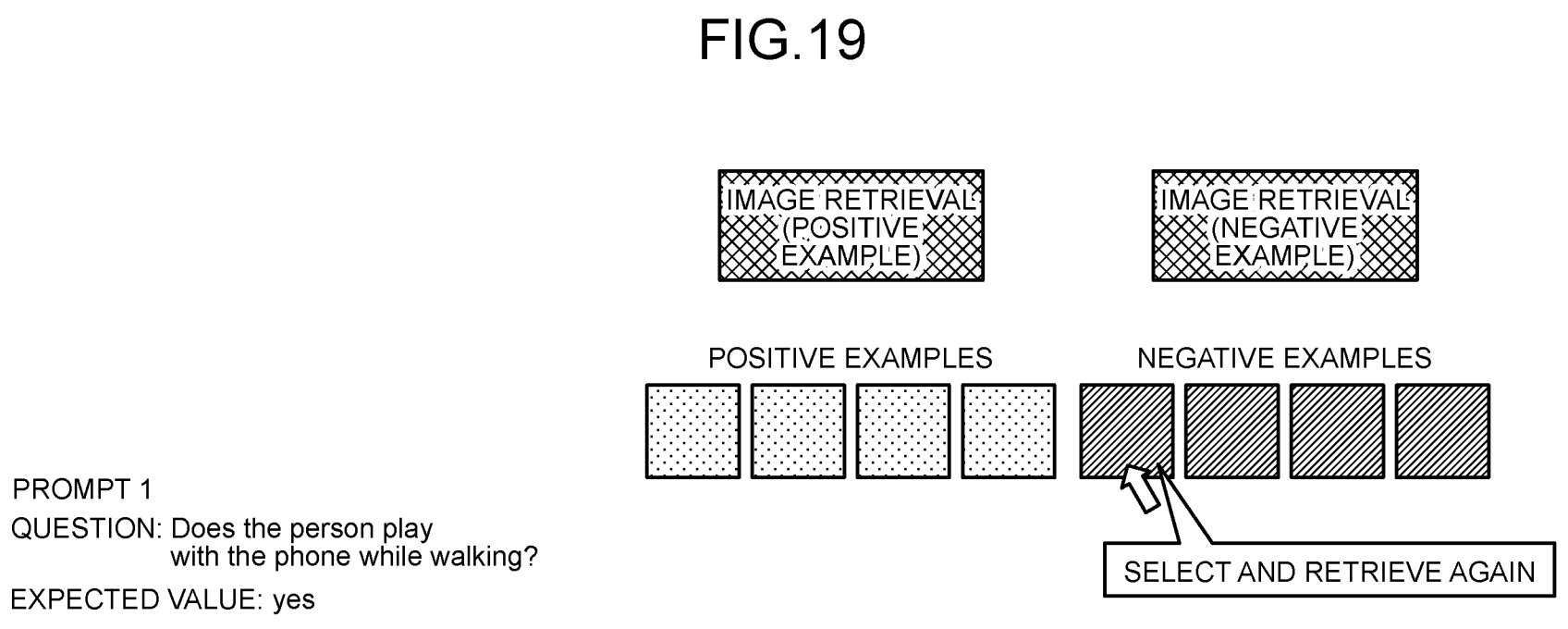

IMAGE RETRIEVAL
(POSITIVE
EXAMPLE)

IMAGE RETRIEVAL
(NEGATIVE
EXAMPLE)

POSITIVE EXAMPLES

NEGATIVE EXAMPLES

SELECT AND RETRIEVE AGAIN

PROMPT 1
QUESTION: Does the person play
with the phone while walking?
EXPECTED VALUE: yes

FIG.22

INFORMATION PROCESSING DEVICE, COMPUTER PROGRAM PRODUCT, AND INFORMATION PROCESSING METHOD

CROSS-REFERENCE TO RELATED APPLICATIONS

This application is based upon and claims the benefit of priority from Japanese Patent Application No. 2023-089841, filed on May 31, 2023; the entire contents of which are incorporated herein by reference.

FIELD

Embodiments described herein relate generally to an information processing device, a computer program product, and an information processing method.

BACKGROUND

Prompt engineering, which makes artificial intelligence (AI) execute processing on the basis of prompts, has conventionally been known. For example, a large-scale pre-trained model CLIP (ICML 2021) based on image-text pairs can perform arbitrary class identification according to similarity to a prompt given by a user. The accuracy varies with how the prompt is given, and thus the prompt is improved manually.

However, with conventional techniques, it is difficult to efficiently improve the prompt to acquire an AI processing result with higher accuracy.

BRIEF DESCRIPTION OF THE DRAWINGS

FIG. 1 is a diagram illustrating an example functional configuration of an information processing device according to a first embodiment;

FIG. 6 is a diagram illustrating an example functional configuration of the information processing device according to a first modification of the first embodiment;

FIG. 7 is a diagram illustrating an example functional configuration of the information processing device according to a second modification of the first embodiment;

FIG. 11 is a diagram illustrating an example functional configuration of an information processing device according to a third embodiment;

FIG. 14 is a diagram illustrating an example functional configuration of an information processing device according to a fourth embodiment;

FIG. 18 is a diagram illustrating first example display information according to the fifth embodiment;

FIG. 19 is a diagram illustrating second example display information according to the fifth embodiment;

FIG. 22 is a diagram illustrating an example functional configuration of an information processing device according to a seventh embodiment.

DETAILED DESCRIPTION

Figure 2:
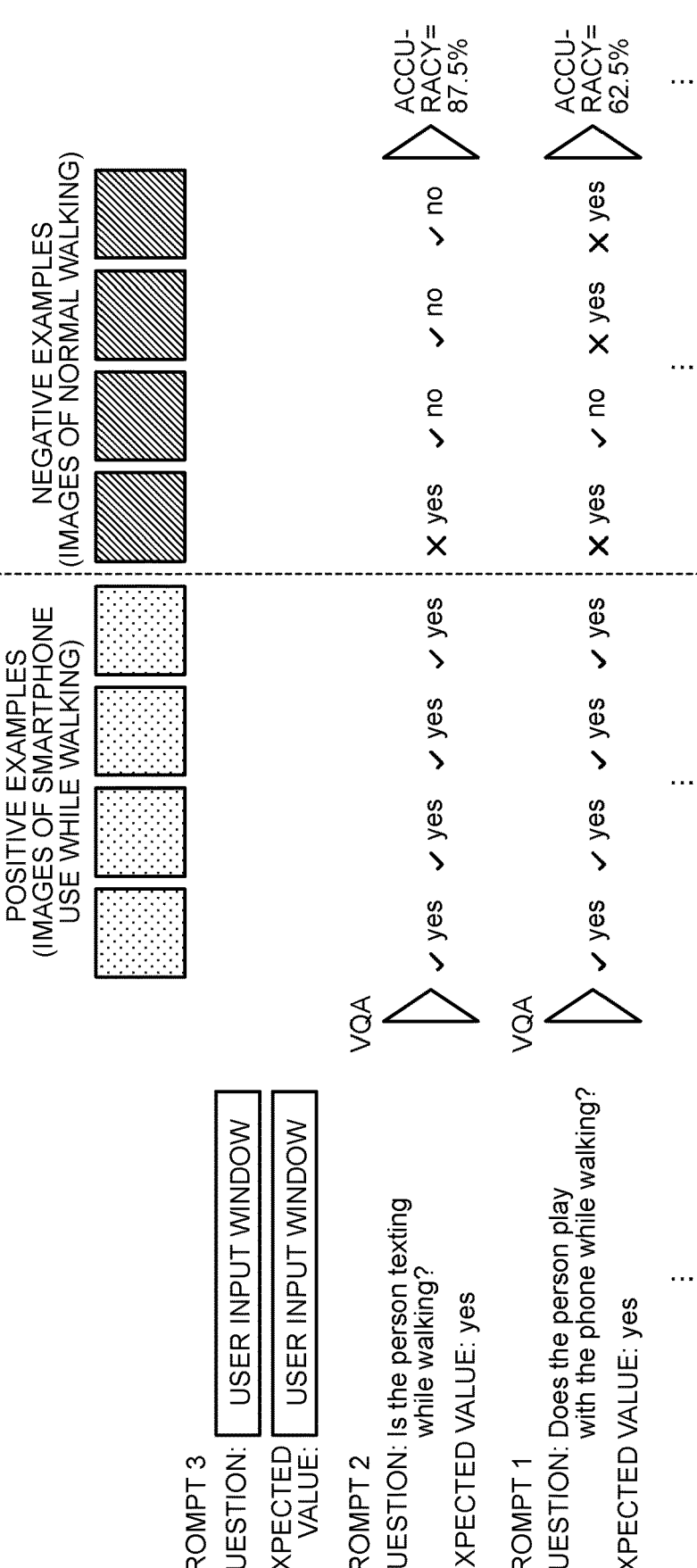
FIG. 2 is a diagram illustrating example display information according to the first embodiment.

In general, according to one embodiment, an information processing device includes a memory and one or more processors coupled to the memory. The one or more processors are configured to: receive input of a prompt including a first text and an expected value of an answer related to the first text; predict, upon input of the first text and at least one image, the answer for each of the at least one image by using an artificial intelligence (AI) model configured to output the answer; compute accuracy of the answer from the expected value and the answer; and display, on a display device, display information including at least the prompt, the answer, and the accuracy.

Exemplary embodiments of an information processing device, a computer program product, and an information processing method will be described in detail below with reference to the accompanying drawings. The present invention is not limited to the following embodiments.

First Embodiment

Figure 1:
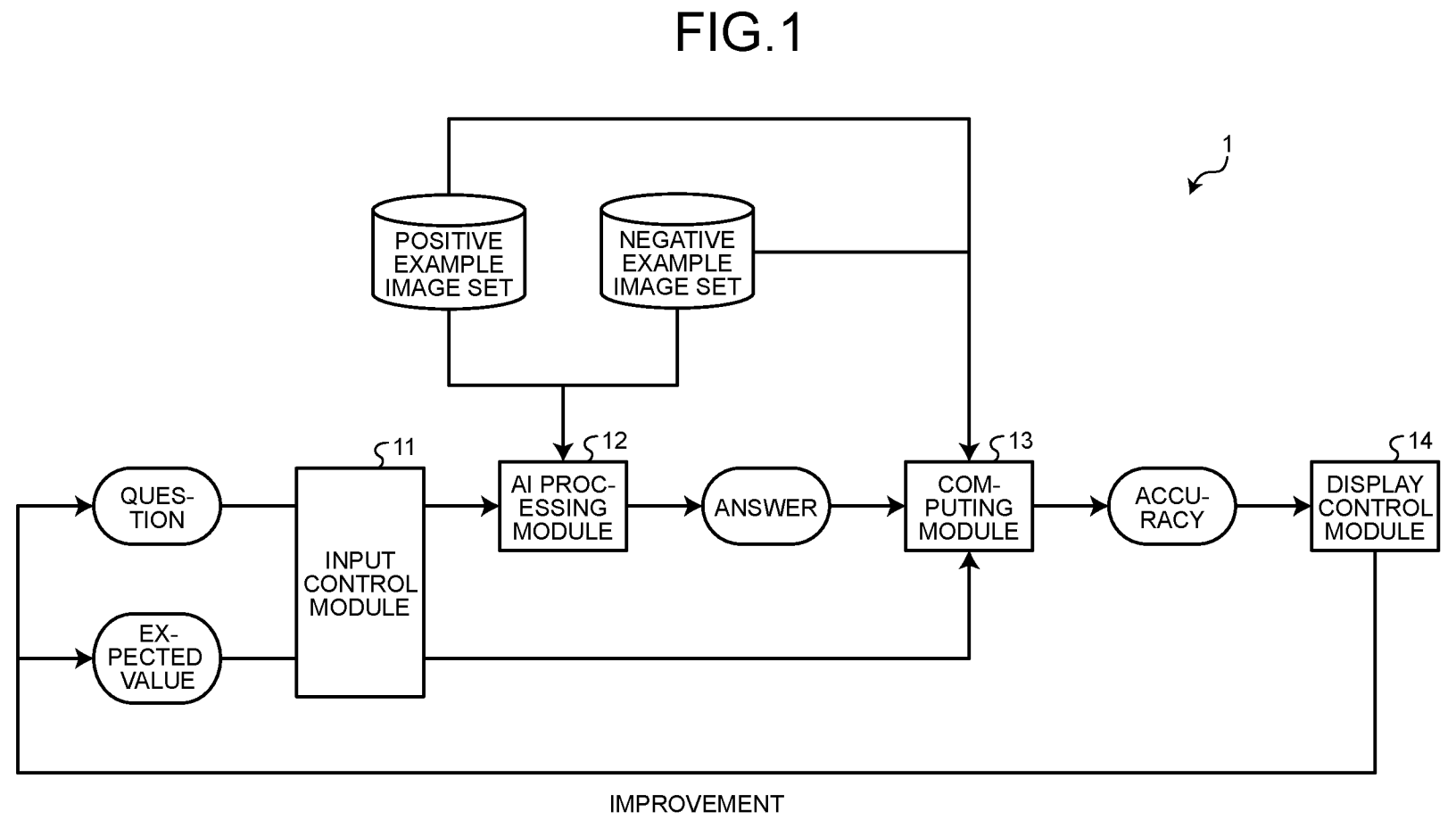

In image detection using visual question answering (VQA), image retrieval with text, and the like, what prompt is used is directly linked with the accuracy. In a first embodiment, an example user interface (UI) that supports prompt improvement leading to a better prompt is described.
Example Functional Configuration FIG. 1 is a diagram illustrating an example functional configuration of an information processing device 1 according to the first embodiment. The information processing device 1 of the first embodiment includes an input control module 11, an AI processing module 12, a computing module 13, and a display control module 14.

The input control module 11 receives input of a prompt. The prompt is text input to an AI that handles an image, a language, and the like. For example, the prompt is a command to the AI. In specific, in the case of VQA, the prompt includes a question (first text) given to the AI detecting an image and its expected value.

The number of the questions may be one or more than one. The expected value is an expected answer expected from VOA. The expected value is a correct answer set for the question. In consideration of notational variations in characters and answers, a plurality of the expected answers may be set.

Note that the input control module 11 may have a function to make a translation into another language (for example, a function to make a translation from Japanese into English) when the prompt is input.

The input control module 11 inputs the question input by a user to the AI processing module 12 and inputs the expected value input by the user to the computing module 13.

The AI processing module 12 executes task processing of an AI model. In the first embodiment, the task of the AI model is VOA that, when an image and the question are input, returns an appropriate answer to the question (image detection result).

In the case of VQA, an image to be input to the task of the AI model for which the prompt is improved is selected from a set of a small number of sample images (for example, five to ten images) including a positive example image set and a negative example image set. The positive example image set is a group of images expected to be detected as answers to the question. The negative example image set is a group of images expected not to be detected as answers to the question.

The sample images are, for example, prepared by the user improving the prompt and stored in a storage device of the information processing device 1.

The computing module 13 computes accuracy of the answers from the AI processing module 12. In specific, the computing module 13 computes accuracy indicating how successfully answers counted as the expected answer are made for the positive example images as follows:

Accuracy of the positive example image set=(Number of the answers counted as the expected answer)/(Number of the positive example images)

Similarly, the computing module 13 computes accuracy indicating how successfully answers not counted as the expected answer are made for the negative example images as follows:

Accuracy of the negative example image set=(Number of the answers not counted as the expected answer)/(Number of the negative example images)

The computing module 13 also computes overall accuracy of the answers as follows:

Overall accuracy=(Rate of the positive example images)*(Accuracy of the positive example image set)+(Rate of the negative example images)*(Accuracy of the negative example image set)

Here, the rate of the positive example images and the rate of the negative example images are computed as follows:

Rate of the positive example images=(Number of the positive example images)/(Number of the positive example images+Number of the negative example images)

Rate of the negative example images=(Number of the negative example images)/(Number of the positive example images+Number of the negative example images)

The display control module 14 displays display information supporting the prompt improvement on a display device. This provides feedback on the result of the prompt improvement to the user.

Example Display Information

FIG. 2 is a diagram illustrating an example of the display information according to the first embodiment. The display information in the first embodiment includes the positive example image set (in the example in FIG. 2, images of smartphone use while walking), the negative example image set (in the example in FIG. 2, images of normal walking), the prompts, the expected values, the answer for each image, the result of determining whether the answer is correct, and the accuracy.

In the example in FIG. 2, the AI processing module 12 receives input of eight images including four positive example images indicating positive examples and four negative example images indicating negative examples and carries out the VQA task. The display information includes the answer for each of the four positive example images and the answer for each of the four negative example images.

Figure 3:
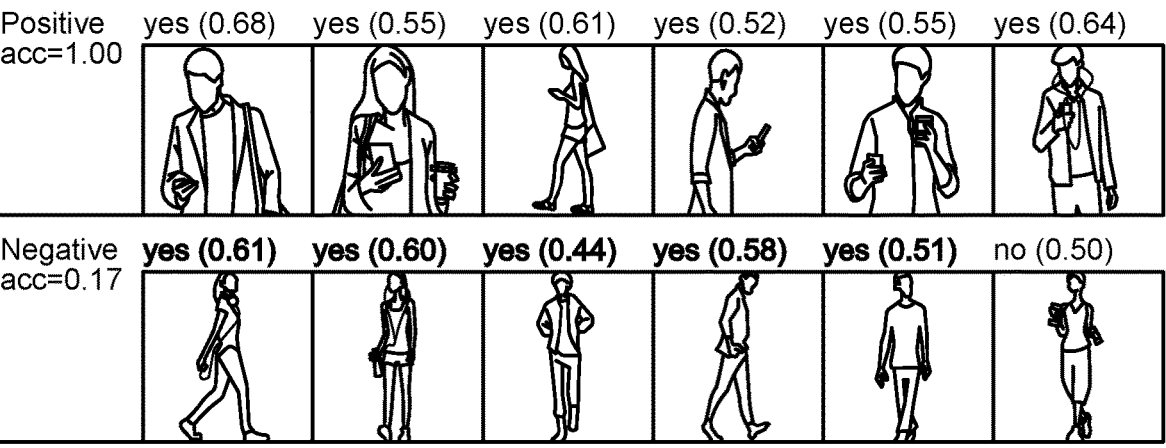
FIG. 3 is a diagram for describing an example bad prompt.

FIG. 3 is a diagram for describing an example bad prompt. FIG. 3 illustrates an example image detection result when an example bad prompt ("Does the person play with the phone while walking?") is input.

In the example in FIG. 3, the accuracy of the positive example image set is 1.00 (100%), and the accuracy of the negative example image set is 0.17 (17%). Thus, with the example prompt in FIG. 3, the overall accuracy is 0.58 (58%).

In the example in FIG. 3, with the expected answer for the images of smartphone use while walking (positive example images) being Yes, six out of six images of smartphone use while walking get the answer Yes. On the other hand, with the expected answer for the images of normal walking (negative example images) being No, five out of six images of normal walking get the answer Yes. The prompt in FIG. 3 is thus an example bad prompt.

Figure 4:
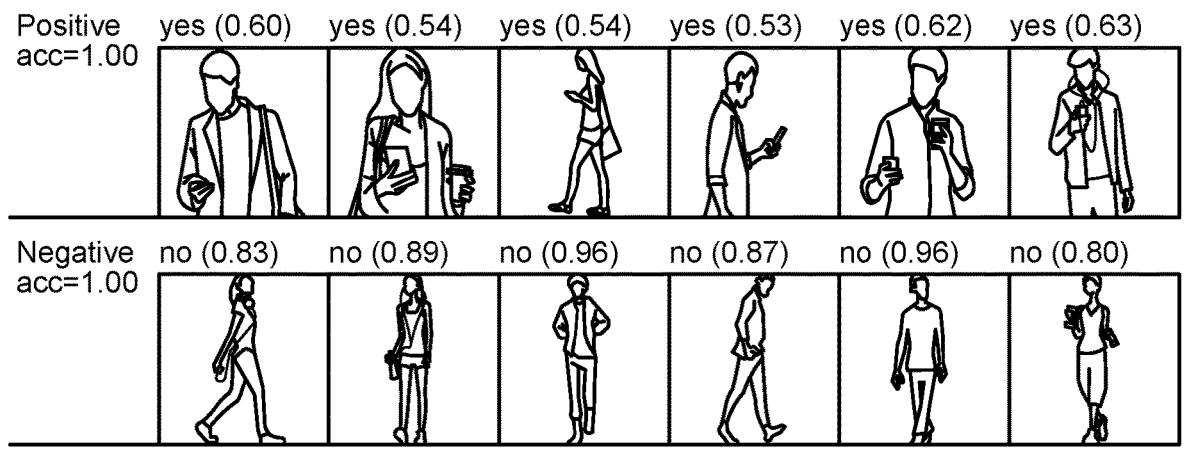
FIG. 4 is a diagram for describing an example good prompt.

FIG. 4 is a diagram for describing an example good prompt. FIG. 4 illustrates an example image detection result when an example good prompt ("Is the person texting while walking?") is input.

In the example in FIG. 4, the accuracy of the positive example image set is 1.00 (100%), and the accuracy of the negative example image set is 1.00 (100%). Thus, with the example prompt in FIG. 4, the overall accuracy is 1.00 (100%).

In the example in FIG. 4, with the expected answer for the images of smartphone use while walking (positive example images) being Yes, six out of six images of smartphone use while walking get the answer Yes. With the expected answer for the images of normal walking (negative example images) being No, six out of six images of normal walking get the answer No. The prompt in FIG. 4 is thus an example good prompt because all get correct answers.

Note that, in the example image detection results in FIGS. 3 and 4, a numerical value (for example, 0.68 and the like) indicating the certainty factor of prediction output by the AI model is also written after the answer Yes or No for each image; however, the certainty factor may not be displayed.

Example of Information Processing Method

Figure 5:
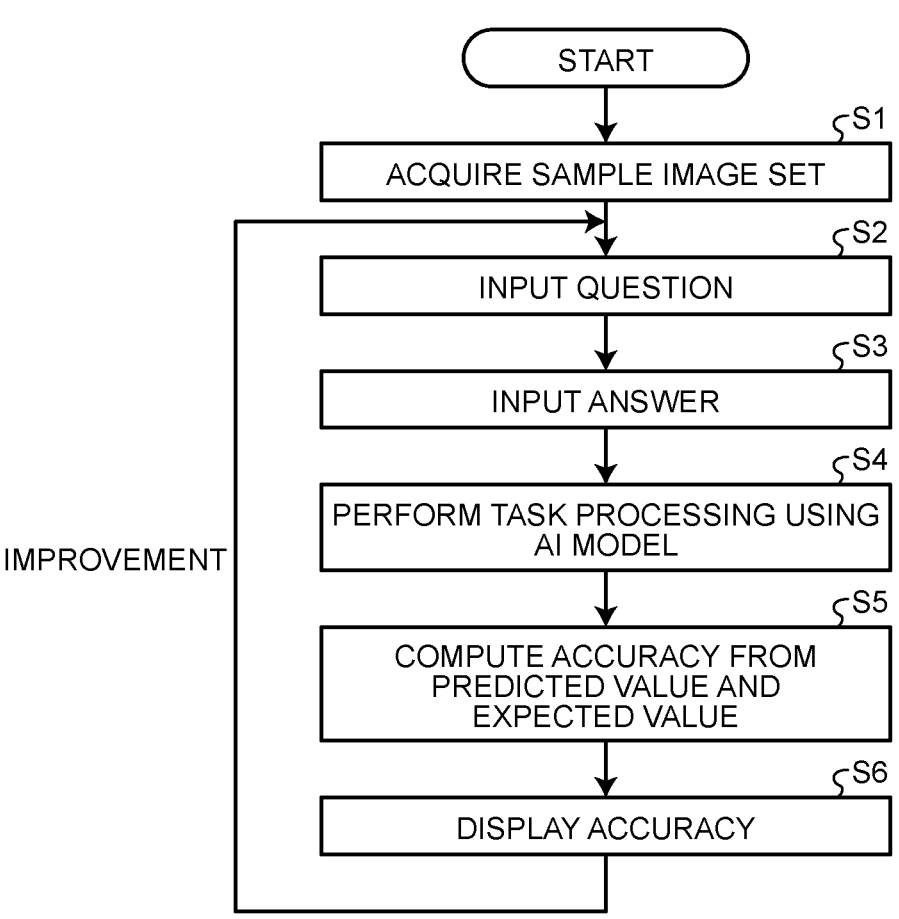
FIG. 5 is a flowchart illustrating an example information processing method according to the first embodiment.

FIG. 5 is a diagram illustrating an example of an information processing method according to the first embodiment. First, the AI processing module 12 acquires the above-described sample image set as image data to be used for prompt improvement (Step S1). Next, the input control module 11 receives input of the prompt including a question and its answer (Steps S2 and S3).

Next, the AI processing module 12 outputs an answer (predicted value) to the question input at Step S2 through the task processing using the AI model, for the sample image set acquired at Step S1 (Step S4).

Next, the computing module 13 computes accuracy from the predicted value output at Step S4 and the expected value input at Step S3 (Step S5).

Next, the display control module 14 displays the display information (see FIG. 2) supporting the prompt improvement on the display device (Step S6) and provides feedback on the result of the prompt improvement to the user.

If the user determines that the prompt needs improvement, the input control module 11 receives input of a new prompt from the user to repeat the processes at Steps S2 to S6.

As described above, in the information processing device 1 of the first embodiment, the input control module 11 receives input of the prompt including the first text (question in the first embodiment) and the expected value of the answer related to the first text. When the first text and at least one image are input, the AI processing module 12 predicts the answer for each of the at least one image by using the AI model that outputs the answer. The computing module 13 computes accuracy of the answer from the expected value and the answer. Then, the display control module 14 displays the display information including at least the prompt, the answer, and the accuracy, on the display device.

With this, the first embodiment enables efficient improvement of the prompt to acquire an AI processing result with higher accuracy.

First Modification of First Embodiment

Figure 6:
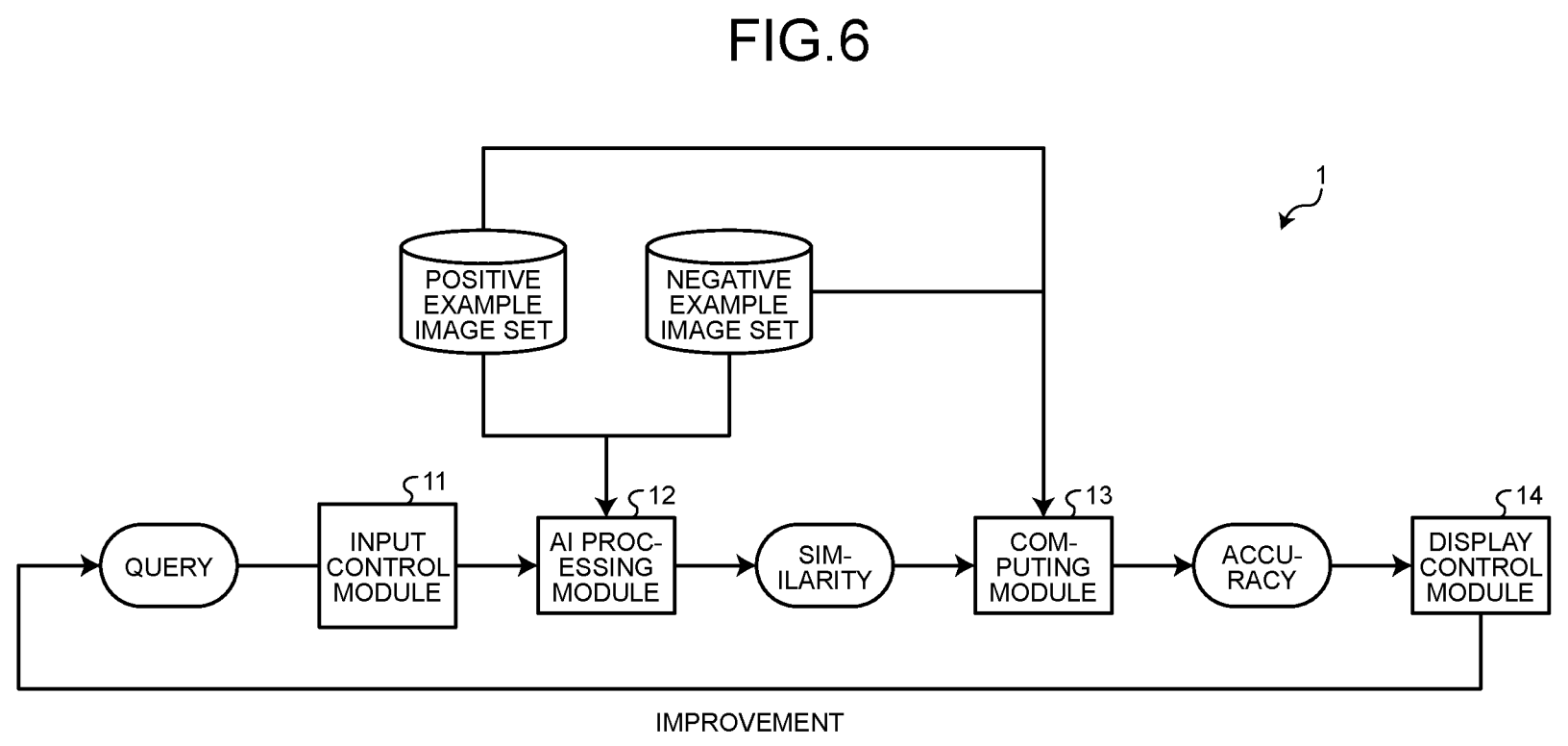

Next, a first modification of the first embodiment will be described. In the description of the first modification, description similar to that of the first embodiment is omitted, and points differing from those of the first embodiment are described. In the first modification, a case where the task of the AI model is an image retrieval task that uses a query expressed by text to retrieve an image similar to the query (image having a specific feature) is described.
Example Functional Configuration FIG. 6 is a diagram illustrating an example functional configuration of the information processing device 1 according to the first modification of the first embodiment. The information processing device 1 of the first modification includes the input control module 11, the AI processing module 12, the computing module 13, and the display control module 14.

In the first modification, the input control module 11 receives input of the query (first text) retrieving an image having a specific feature, as the prompt. The expected value of the answer is that similarity (first similarity), to the image having the specific feature, is greater than a threshold for the positive example images and similarity, to the image having the specific feature, is equal to or less than the threshold for the negative example images.

The AI processing module 12 executes task processing of the AI model that, when an image and the query are input, returns similarity between the image and the query. An image having higher similarity to the query indicates an image predicted by the AI model to be an image expressing the query.

The computing module 13 subjects the similarity output by the AI processing module 12 to threshold processing, and, if the similarity is greater than the threshold, converts the similarity into yes and, if the similarity is equal to or less than the threshold, converts the similarity into no. Then, the computing module 13 computes whether the similarity is greater than the threshold for the positive example images and whether the similarity is equal to or less than the threshold for the negative example images, using the following accuracy:

Accuracy of the positive example image set=(Number of yes)/(Number of the positive example images)

Accuracy of the negative example image set=(Number of no)/(Number of the negative example images)

The computing module 13 also computes overall accuracy of the similarity as follows:

Overall accuracy=(Rate of the positive example images)*(Accuracy of the positive example image set)+(Rate of the negative example images)*(Accuracy of the negative example images)

Here, the rate of the positive example images and the rate of the negative example images are computed as follows:

Rate of the positive example images=(Number of the positive example images)/(Number of the positive example images+Number of the negative example images)

Rate of the negative example images=(Number of the negative example images)/(Number of the positive example images+Number of the negative example images)

Second Modification of First Embodiment

Figure 7:
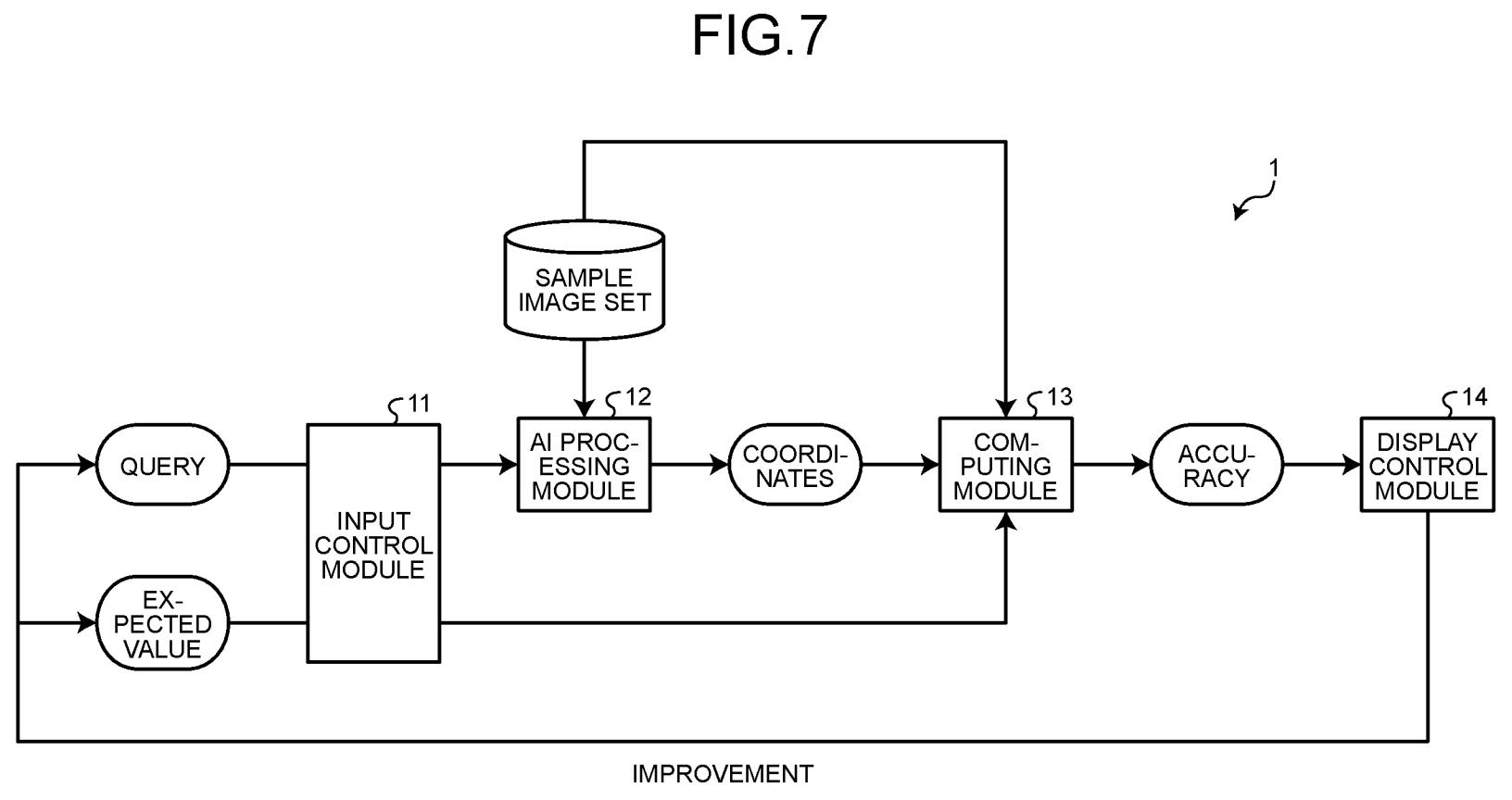

Next, a second modification of the first embodiment will be described. In the description of the second modification, description similar to that of the first embodiment is omitted, and points differing from those of the first embodiment are described. In the second modification, a case where the task of the AI model is a visual grounding task that identifies a specific region (for example, a region where a specific object is indicated) in an image using a bounding box or the like is described.
Example Functional Configuration FIG. 7 is a diagram illustrating an example functional configuration of the information processing device 1 according to the second modification of the first embodiment. The information processing device 1 of the second modification includes the input control module 11, the AI processing module 12, the computing module 13, and the display control module 14.

Similar to the first embodiment, the sample images are, for example, prepared by the user improving the prompt and stored in the storage device of the information processing device 1.

In the second modification, the input control module 11 receives input of a query used for image grounding and an expected value, as the prompt. Image grounding is processing of extracting an image region according to a query.

The query is text indicating the specific region, such as a phrase indicating an object that the user wants to retrieve from the sample images. As the expected value, coordinates indicating the position of the object that the user wants to find in each sample image (coordinates indicating the position of the specific region) are specified. The coordinates indicating the position of the object are specified, for example, with a set of numerical values, such as (left, top, right, bottom) or (top left, bottom right), indicating the region of the bounding box.

The AI processing module 12 executes task processing of the AI model. In the second modification, the task of the AI model is processing that, when an image and the query are input, predicts appropriate coordinates according to the query (image grounding result).

The computing module 13 computes accuracy of the coordinates predicted by the AI processing module 12. In the second modification, the closer the coordinates predicted by the AI processing module 12 are to the coordinates of the expected value, the higher accuracy the computing module 13 computes. For example, the computing module 13 uses a mean absolute error or the like between the coordinates predicted by the AI processing module 12 and the coordinates of the expected value to compute the accuracy.

Second Embodiment

Figure 8:
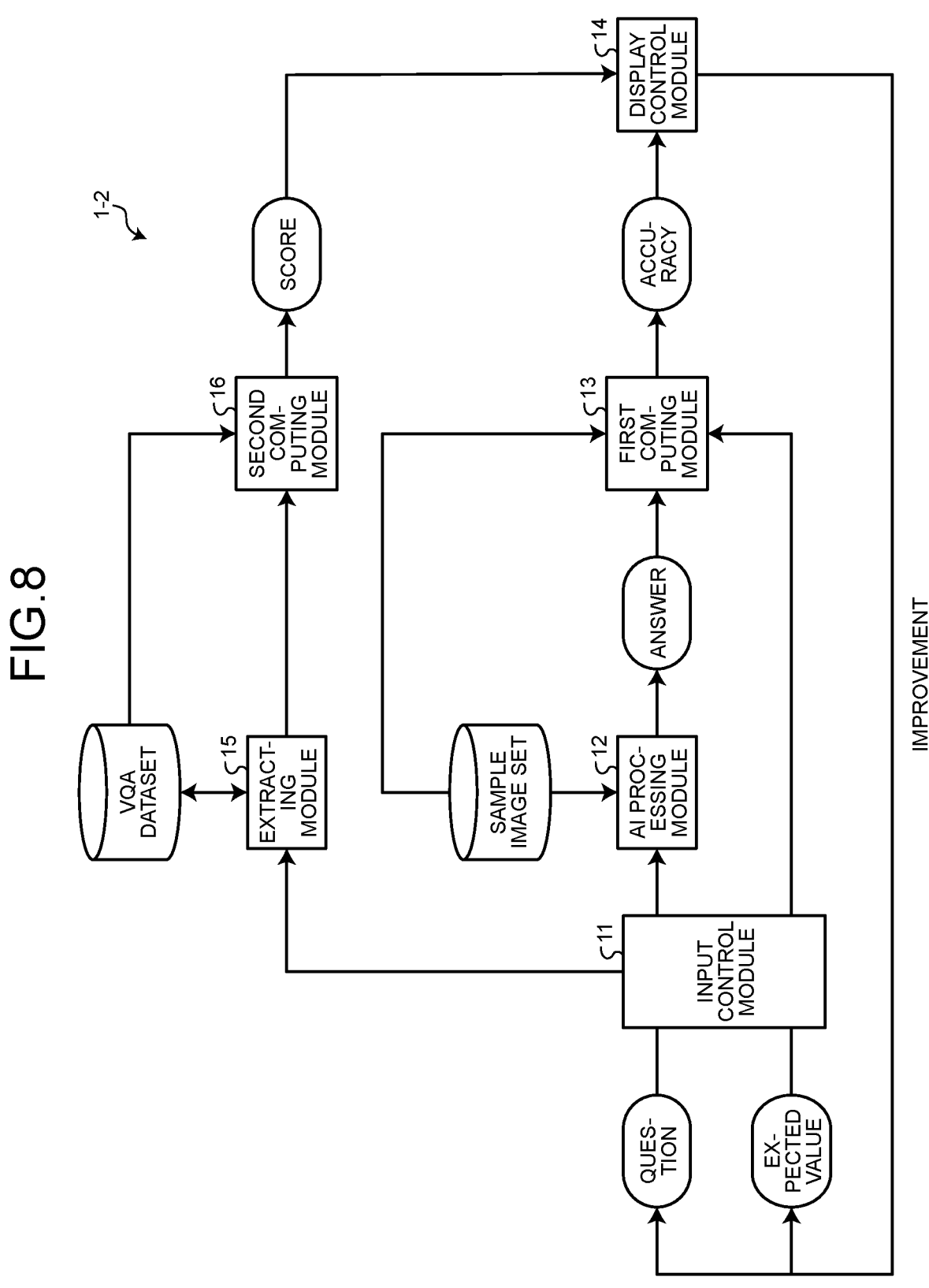
FIG. 8 is a diagram illustrating an example functional configuration of an information processing device according to a second embodiment.

Next, a second embodiment will be described. In the description of the second embodiment, description similar to that of the first embodiment is omitted, and points differing from those of the first embodiment are described. In the second embodiment, a configuration that provides feedback on the quality of the prompt itself is described. Note that, in the second embodiment, a case where the task of an AI processing module 12 is a VQA task is described; however, the same applies to other tasks.
Example Functional Configuration FIG. 8 is a diagram illustrating an example functional configuration of an information processing device 1-2 according to the second embodiment. The information processing device 1-2 of the second embodiment includes the input control module 11, the AI processing module 12, a first computing module 13, the display control module 14, an extracting module 15, and a second computing module 16. The second embodiment has the configuration of the first embodiment with the extracting module 15 and the second computing module 16 added.

The input control module 11 inputs an input question to the AI processing module 12 and the extracting module 15 and inputs an input expected value to the first computing module 13.

The AI processing module 12 and the first computing module 13 are similar to the AI processing module 12 and the computing module 13 of the first embodiment, and their description is thus omitted. That is, the function to predict an answer using an AI model and to compute accuracy of the answer is similar to that of the first embodiment.

The AI model carrying out the VQA task is trained using a VQA dataset. The VOA dataset includes an image group and a question group associated with the image group. The trained AI model can properly answer a question that is included in the VQA dataset but may not always properly answer a question that is not included in the VOA dataset.

The extracting module 15 extracts K samples from the VOA dataset in descending order of similarity to the question input from the input control module 11 (TopK extraction).

Figure 9:
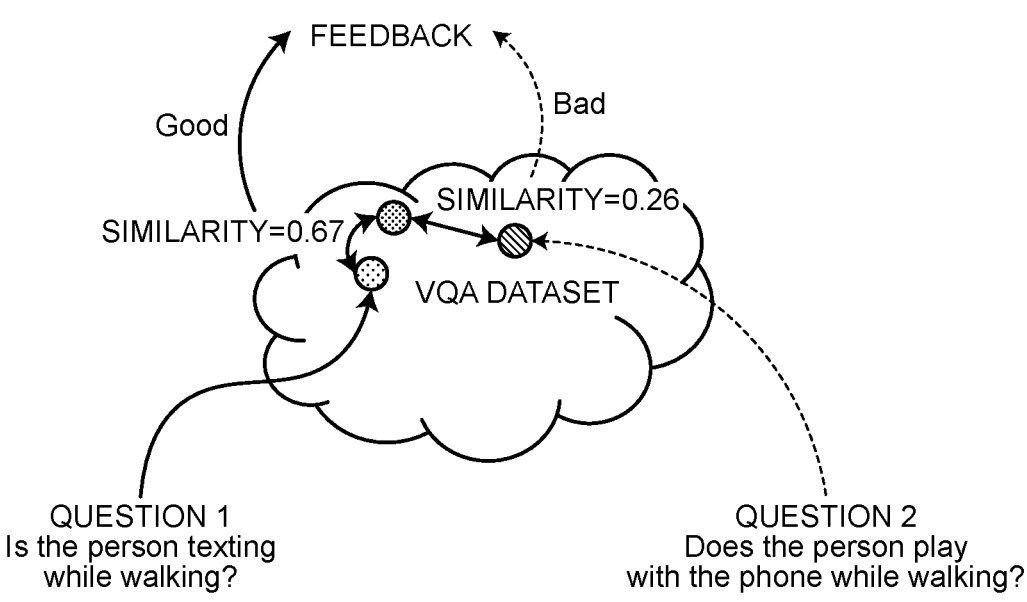
FIG. 9 is a diagram illustrating example similarity computation according to the second embodiment.

FIG. 9 is a diagram illustrating example computation of the similarity according to the second embodiment. There are various possible methods of computing the similarity. For example, the extracting module 15 converts (embeds) the text of the question into a fixed-length vector and calculates cosine similarity between the vector of a sample included in the VQA dataset and the vector of the input question.

To convert text into a vector, for example, there is a method using a text encoder of the AI model. Alternatively, for example, a Bag of words (BoW) method may be used for conversion into a vector. BoW is a method of vectorizing text by listing all words contained in both pieces of text and setting the part of a word that occurs in both sentences as 1 and the part of a word that does not occur in both sentences as 0.

Returning to FIG. 8, the second computing module 16 computes a score indicating similarity between the question and the VOA dataset on the basis of the similarity to each of the K samples extracted by the extracting module 15. The second computing module 16 may use the similarity used for the TopK extraction as it is or may obtain the score by a similarity computing method differing from TopK.

Figure 10:
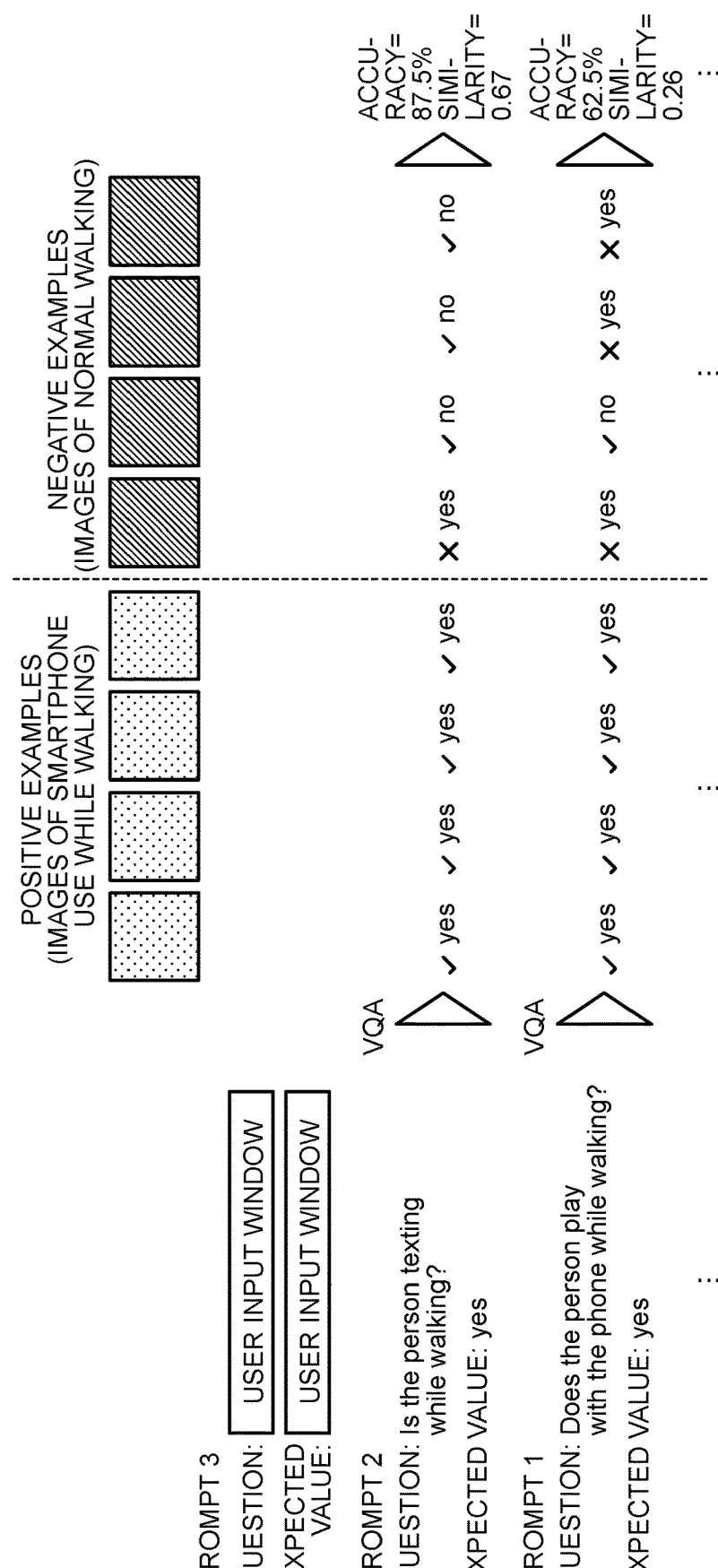
FIG. 10 is a diagram illustrating example display information according to the second embodiment.

The display control module 14 displays display information supporting the prompt improvement on the display device.
Example Display Information FIG. 10 is a diagram illustrating an example of the display information according to the second embodiment. The display information in the second embodiment includes the positive example image set (in the example in FIG. 10, images of smartphone use while walking), the negative example image set (in the example in FIG. 10, images of normal walking), the prompts, the expected values, the answer for each image, the result of determining whether the answer is correct, the accuracy, and the similarity. The second embodiment further displays the score computed by the second computing module 16 as the similarity.

As described above, in the second embodiment, the extracting module 15 extracts K samples from a prompt dataset (in the second embodiment, the VOA dataset) storing therein at least one image and second text associated with the at least one image as a sample, in descending order of similarity (second similarity) between the first text included in the prompt and the second text. The second computing module 16 computes similarity (third similarity) between the first text and a sample image dataset on the basis of the similarity of each of the K samples. The display information further includes the similarity (third similarity).

With this, the second embodiment enables feedback on the similarity between the input question (an example of the prompt) and the samples in the VOA dataset (an example of the prompt dataset) to the user.

Third Embodiment

Figure 11:
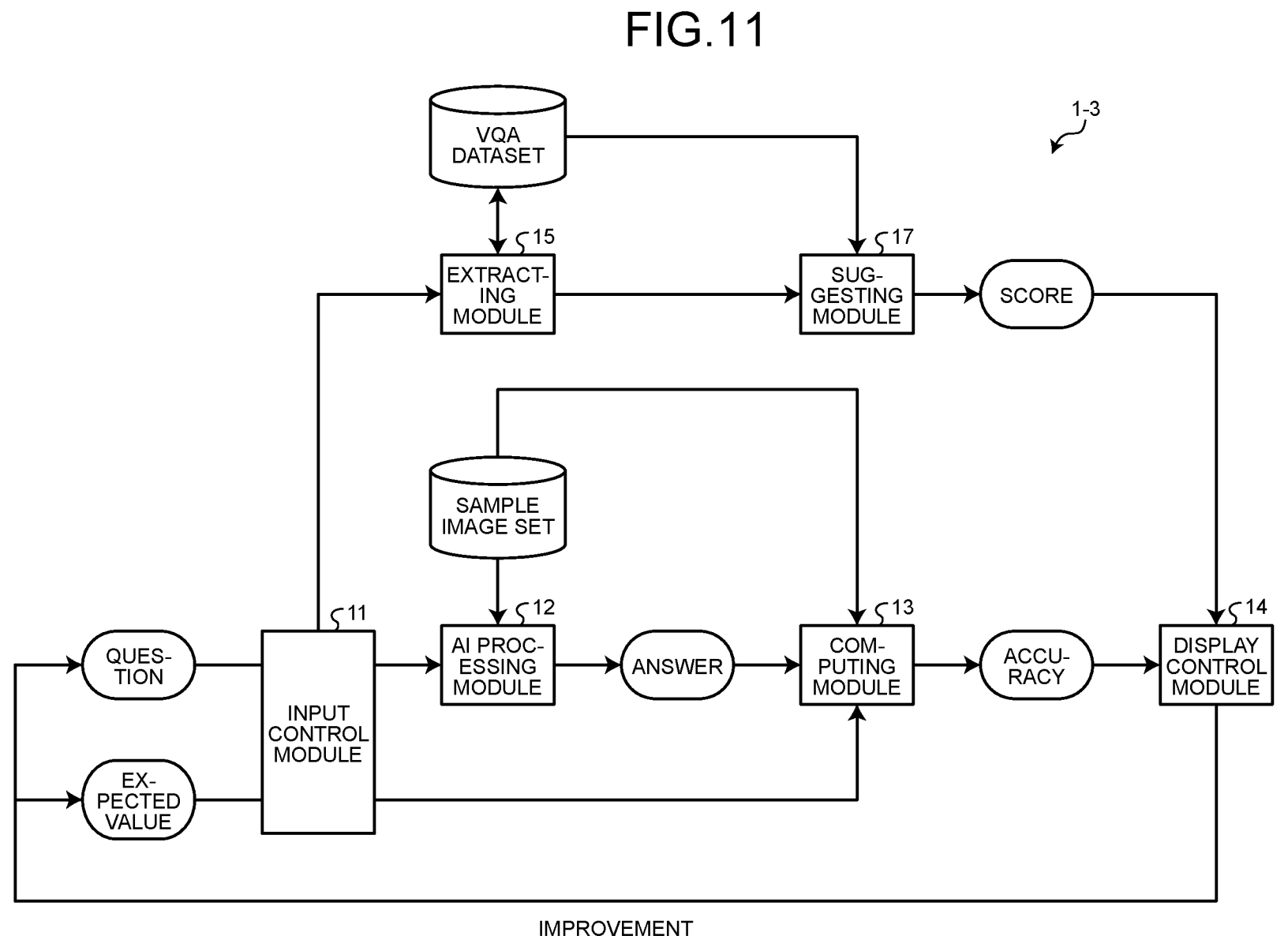

Next, a third embodiment will be described. In the description of the third embodiment, description similar to that of the first embodiment is omitted, and points differing from those of the first embodiment are described. In the third embodiment, a configuration that suggests a candidate for the prompt is described. Note that, in the third embodiment, a case where the task of an AI processing module 12 is a VQA task is described; however, the same applies to other tasks.
Example Functional Configuration FIG. 11 is a diagram illustrating an example functional configuration of an information processing device 1-3 according to the third embodiment. The information processing device 1-3 of the third embodiment includes the input control module 11, the AI processing module 12, the computing module 13, the display control module 14, the extracting module 15, and a suggesting module 17. The third embodiment has the configuration of the first embodiment with the extracting module 15 and the suggesting module 17 added.

The input control module 11 inputs an input question to the AI processing module 12 and the extracting module 15 and inputs an input expected value to the computing module 13.

The AI processing module 12 and the computing module 13 are similar to the AI processing module 12 and the computing module 13 of the first embodiment, and their description is thus omitted. That is, the function to predict an answer using an AI model and to compute accuracy of the answer is similar to that of the first embodiment.

The extracting module 15 extracts K samples from the VOA dataset in descending order of similarity to the question input from the input control module 11 (TopK extraction).

The suggesting module 17 suggests a candidate for the question (suggested text) on the basis of the result of the TopK extraction at the extracting module 15.

Figure 12:
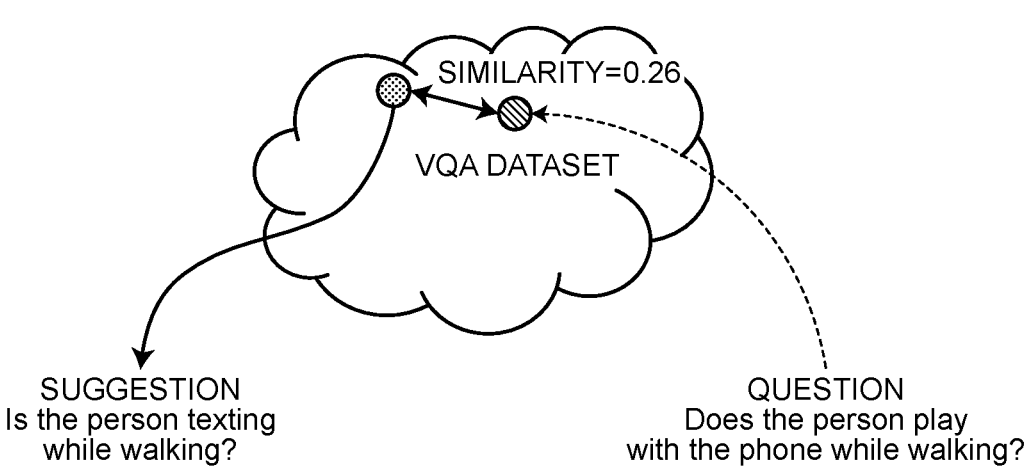
FIG. 12 is a diagram illustrating example suggestion of a candidate for a question according to the third embodiment.

FIG. 12 is a diagram illustrating example suggestion of a candidate for the question according to the third embodiment. FIG. 12 exemplifies a case where the candidate for the question having higher similarity to a sample extracted through the TopK extraction is suggested because the similarity between the input question and a sample in the VQA dataset is 0.26 (lower than a predetermined threshold).

Note that, for example, the candidate for the question may be suggested by a method that presents a question included in a sample extracted through the TopK extraction as it is (method that presents a question included in the VQA dataset). Alternatively, for example, the candidate for the question may be suggested after revised to a more appropriate sentence by a pre-trained language model.

Figure 13:
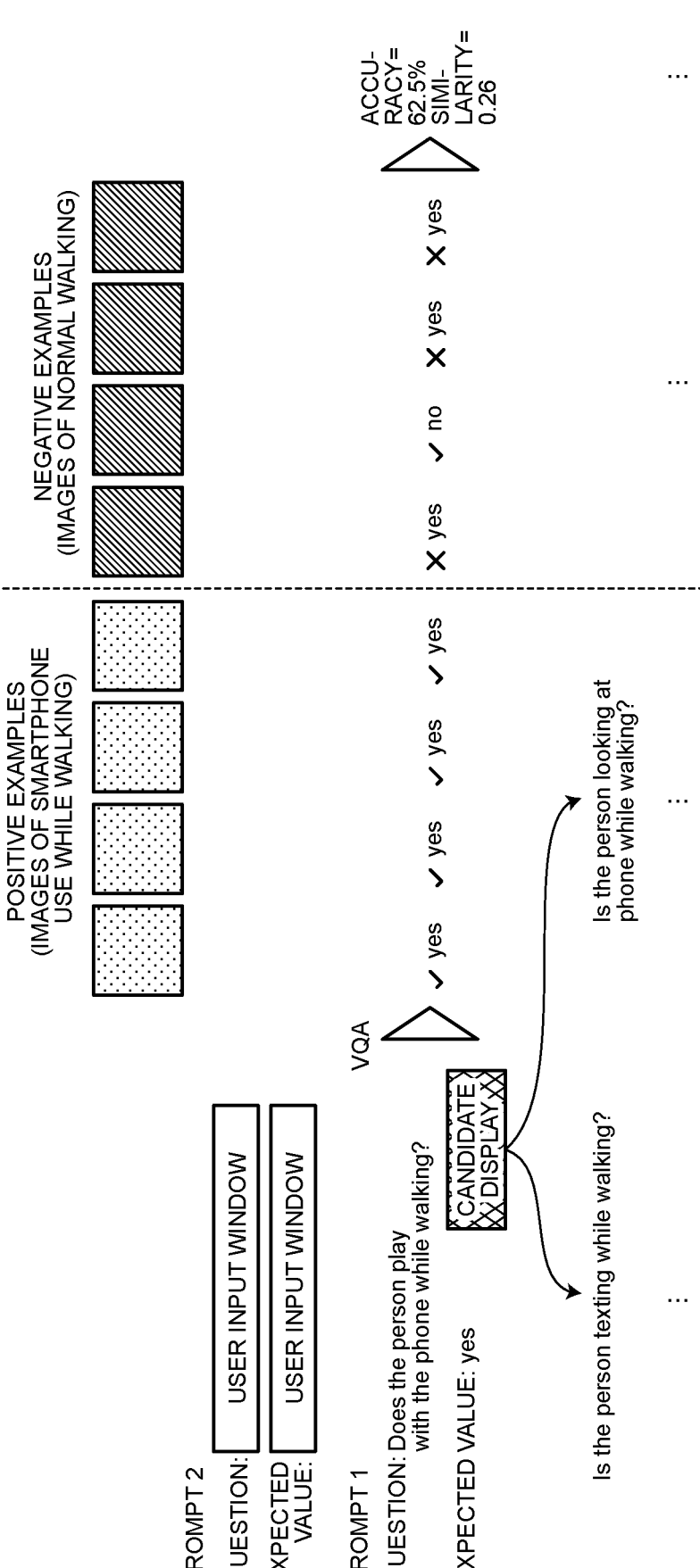
FIG. 13 is a diagram illustrating example display information according to the third embodiment.

Returning to FIG. 11, the display control module 14 displays display information supporting the prompt improvement on the display device.
Example Display Information FIG. 13 is a diagram illustrating an example of the display information according to the third embodiment. The display information in the third embodiment includes the positive example image set (in the example in FIG. 13, images of smartphone use while walking), the negative example image set (in the example in FIG. 13, images of normal walking), the prompt, the expected value, the answer for each image, the result of determining whether the answer is correct, the accuracy, and the similarity. The third embodiment further displays the Candidate Display button.

If the Candidate Display button illustrated in FIG. 13 is pressed, the display control module 14 displays candidates for the question suggested by the suggesting module 17.

As described above, the third embodiment can provide feedback on a more appropriate candidate for the question to the user on the basis of the similarity between the input question (an example of the prompt) and a sample in the VOA dataset (an example of the prompt dataset).

Fourth Embodiment

Figure 14:
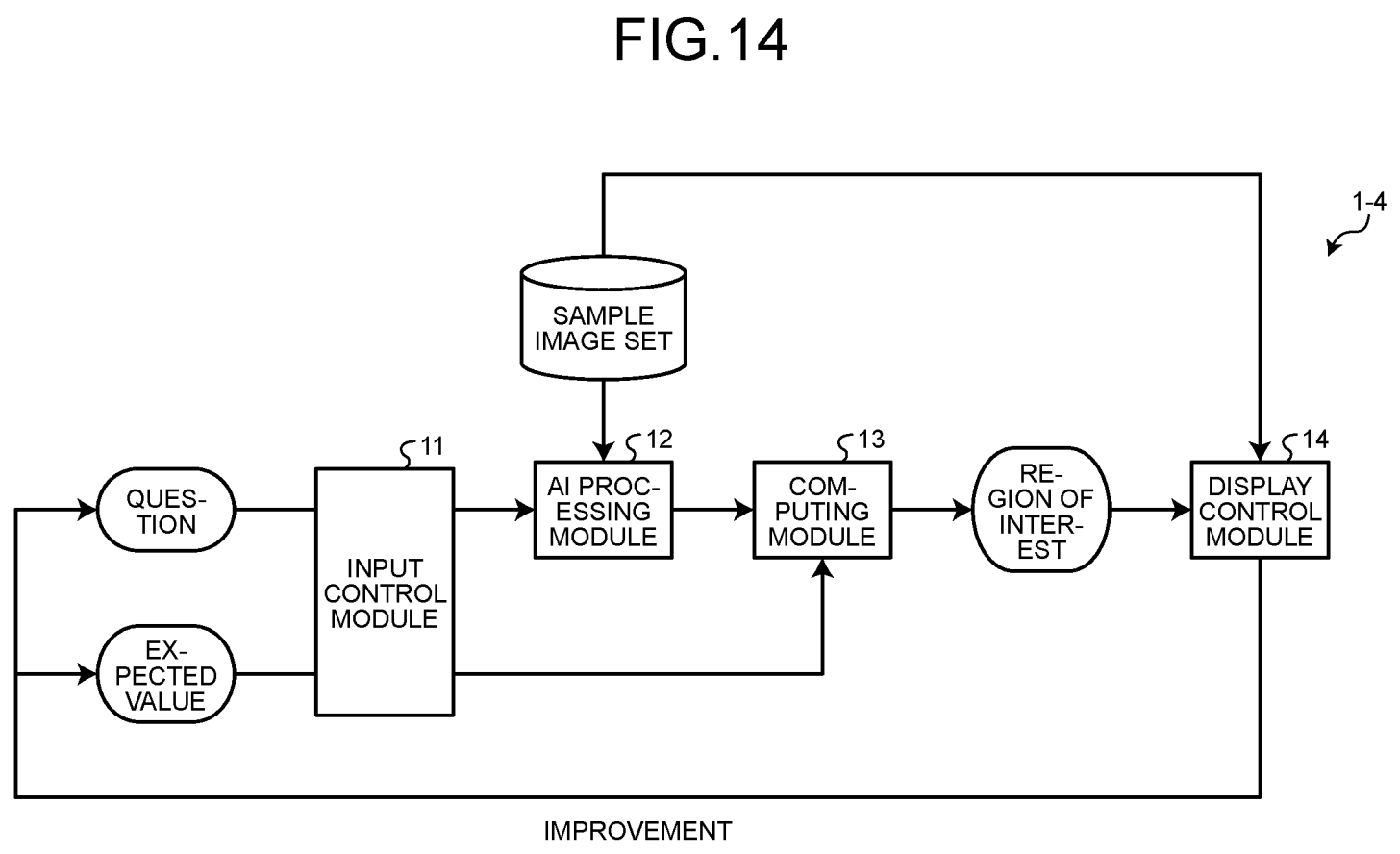

Next, a fourth embodiment will be described. In the description of the fourth embodiment, description similar to that of the first embodiment is omitted, and points differing from those of the first embodiment are described. In the fourth embodiment, a configuration that visualizes a region of interest corresponding to the prompt on an image and visualizes text corresponding to the region of interest on the prompt is described. Note that, in the fourth embodiment, a case where the task of an AI processing module 12 is a VQA task; however, the same applies to other tasks.
Example Functional Configuration FIG. 14 is a diagram illustrating an example functional configuration of an information processing device 1-4 according to the fourth embodiment. The information processing device 1-4 of the fourth embodiment includes the input control module 11, the AI processing module 12, the computing module 13, and the display control module 14.

The input control module 11 and the AI processing module 12 are similar to the input control module 11 and the AI processing module 12 of the first embodiment, and their description is thus omitted.

The computing module 13 visualizes the region of interest noted by an AI model using, for example, Grad-Cam (R. R. Selvaraju et al., "Grad-CAM: Visual Explanations from Deep Networks via Gradient-based Localization", ICCV 2017, 2017). Grad-Cam is a technique for visualizing where in an image reaction occurs when output is given. With the AI model carrying out a VOA task, there are two possible patterns: a case of visualization on an image side and a case of visualization on a question text side.

Figure 15:
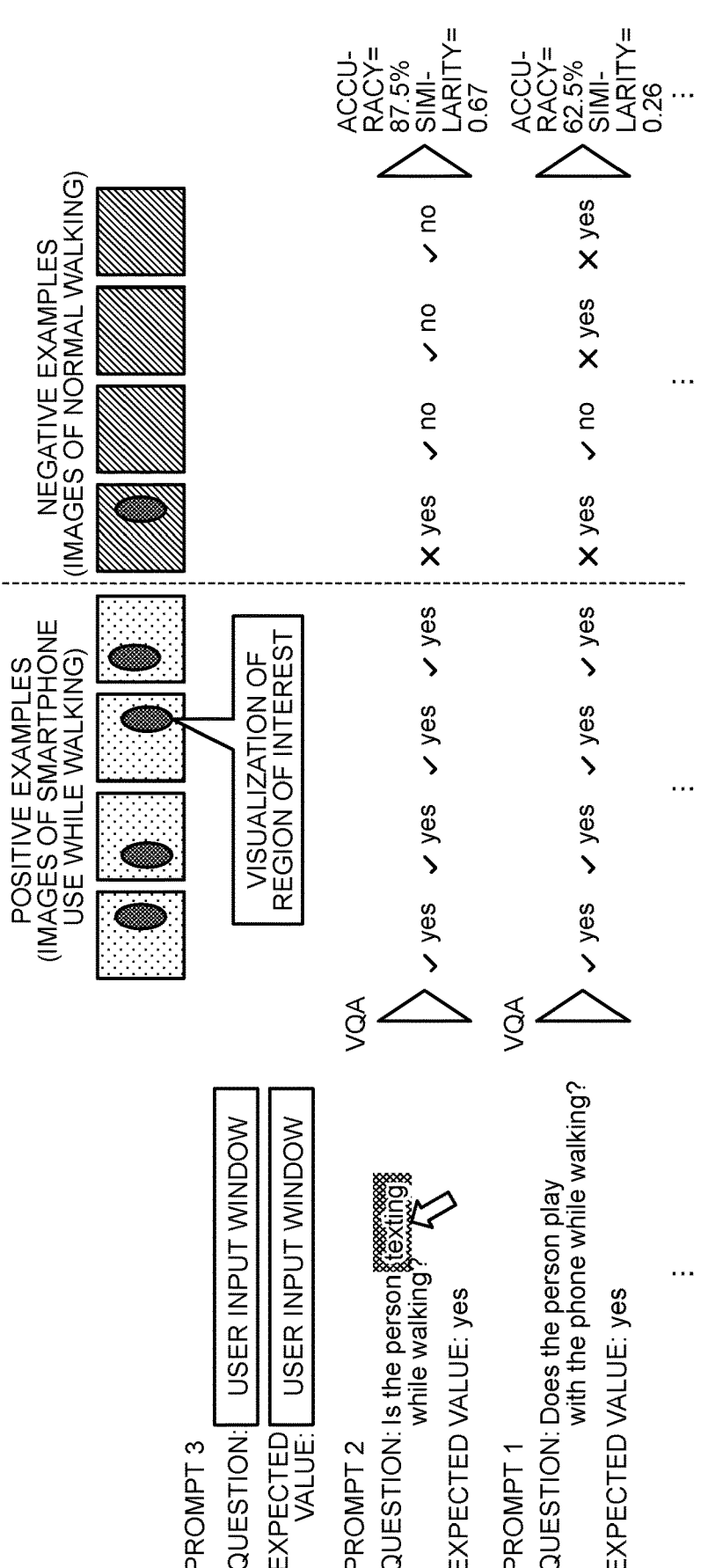
FIG. 15 is a diagram illustrating first example display information (a case of visualization on an image side) according to the fourth embodiment.

The display control module 14 displays display information supporting the prompt improvement on the display device.
Example Display Information FIG. 15 is a first example of the display information (a case of visualization on the image side) according to the fourth embodiment. The display information in the fourth embodiment includes the positive example image set (in the example in FIG. 15, images of smartphone use while walking), the negative example image set (in the example in FIG. 15, images of normal walking), the prompts, the expected values, the answer for each image, the result of determining whether the answer is correct, the accuracy, and the similarity. The fourth embodiment visualizes the regions of interest on the images.

The regions of interest vary according to a word contained in the question text of the prompt. Thus, the display control module 14 displays the regions of interest on the images according to, for example, a word pointed with a mouse.

Figure 16:
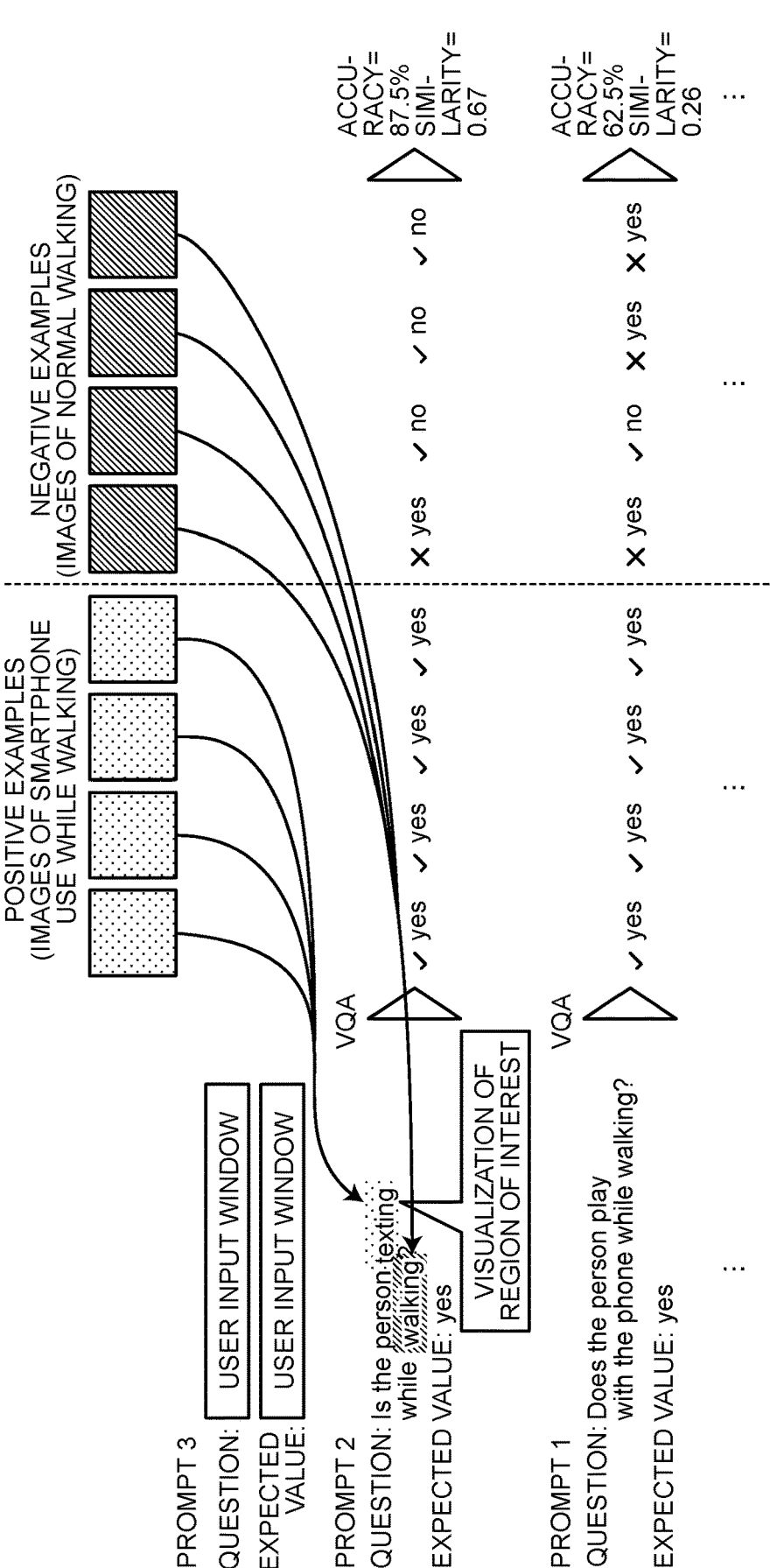
FIG. 16 is a diagram illustrating second example display information (a case of visualization on a text side) according to the fourth embodiment.

FIG. 16 is a diagram illustrating a second example of the display information (a case of visualization on the text side) according to the fourth embodiment. In the example in FIG. 16, the display control module 14 visualizes both of the region of interest in the question of the prompt noted in the VQA task for the positive example images and the region of interest in the question of the prompt noted in the VOA task for the negative example images.

As described above, in the fourth embodiment, the computing module 13 executes processing of visualizing the region of interest noted by the AI model for at least one image according to a word contained in the question (first text). The display information further includes information indicating the region of interest noted according to selection of the word for each of the at least one image (FIG. 15).

Furthermore, the computing module 13 executes processing of visualizing a word of interest noted by the AI model between words contained in the question (first text) when the at least one image is processed. The display information further includes information indicating the word of interest for each of the at least one image (FIG. 16).

With this, the fourth embodiment enables feedback on the region of interest and the word of interest noted by the AI model to the user.

Fifth Embodiment

Next, a fifth embodiment will be described. In the description of the fifth embodiment, description similar to that of the first embodiment is omitted, and points differing from those of the first embodiment are described. In the fifth embodiment, a function to prepare a sample image set by retrieving an image from a network, such as the Internet, on the basis of the text of the prompt is described.

Example Functional Configuration

Figure 17:
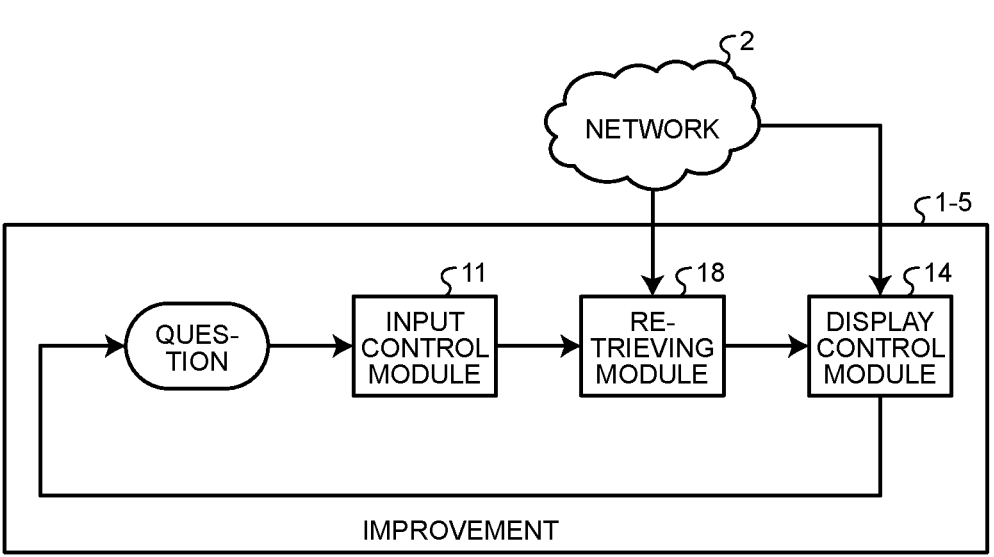
FIG. 17 is a diagram illustrating an example functional configuration of an information processing device according to a fifth embodiment.

FIG. 17 is a diagram illustrating an example functional configuration of an information processing device 1-5 according to the fifth embodiment. The information processing device 1-5 of the fifth embodiment includes the input control module 11, a retrieving module 18, and the display control module 14. Note that, to simplify the description, the example in FIG. 17 illustrates only the function relating to the image retrieval and omits the functions to support the prompt improvement (the AI processing module 12, the computing module 13, and the like) described in the first to fourth embodiments.

The input control module 11 inputs the prompt input by the user to the retrieving module 18.

The retrieving module 18 retrieves an image from a network 2, such as the Internet, on the basis of the text (first text) of the input prompt and inputs the image to the display control module 14.

The display control module 14 displays display information supporting preparation of a sample image set for the prompt improvement on the display device.

Example Display Information

FIG. 18 is a diagram illustrating a first example of the display information according to the fifth embodiment. FIG. 19 is a diagram illustrating a second example of the display information according to the fifth embodiment.

In the first example in FIG. 18, if the Image Retrieval (Positive Example) button is pressed, the display control module 14 retrieves an image from the network 2 on the basis of the text of the prompt and displays the result in a positive example display field. Similarly, if the Image Retrieval (Negative Example) button is pressed, the display control module 14 retrieves an image from the network 2 on the basis of the text of the prompt and displays the result in a negative example display field.

To change the image, the user presses the Image Retrieval (Positive Example) button or the Image Retrieval (Negative Example) button again, and the display control module 14 then displays an image retrieved by the retrieving module 18 again in the positive example display field or the negative example display field.

The user can also select an image and press the Image Retrieval (Positive Example) button or the Image Retrieval (Negative Example) button to change the selected image (see FIG. 19).

As described above, the fifth embodiment can reduce time and effort to prepare a sample image set for the prompt improvement.

Sixth Embodiment

Next, a sixth embodiment will be described. In the description of the sixth embodiment, description similar to that of the first embodiment is omitted, and points differing from those of the first embodiment are described. In the sixth embodiment, a function to support prompt creation by captioning (putting a caption) on a sample image set is described.

Example Functional Configuration

Figure 20:
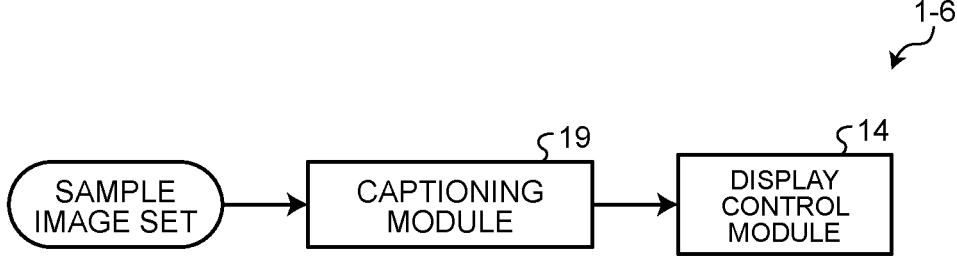
FIG. 20 is a diagram illustrating an example functional configuration of an information processing device according to a sixth embodiment.

FIG. 20 is a diagram illustrating an example functional configuration of an information processing device 1-6 according to the sixth embodiment. The information processing device 1-6 of the sixth embodiment includes a captioning module 19 and the display control module 14. Note that, to simplify the description, the example in FIG. 20 illustrates only the function relating to the captioning and omits the functions to support the prompt improvement (the AI processing module 12, the computing module 13, and the like) described in the first to fourth embodiments.

The captioning module 19 generates a caption for an image by inputting the image to a captioning engine (for example, a pre-trained captioning AI). The caption for the image is text describing the image.

The display control module 14 displays display information including the caption generated by the captioning module 19.

Example Display Information

Figure 21:
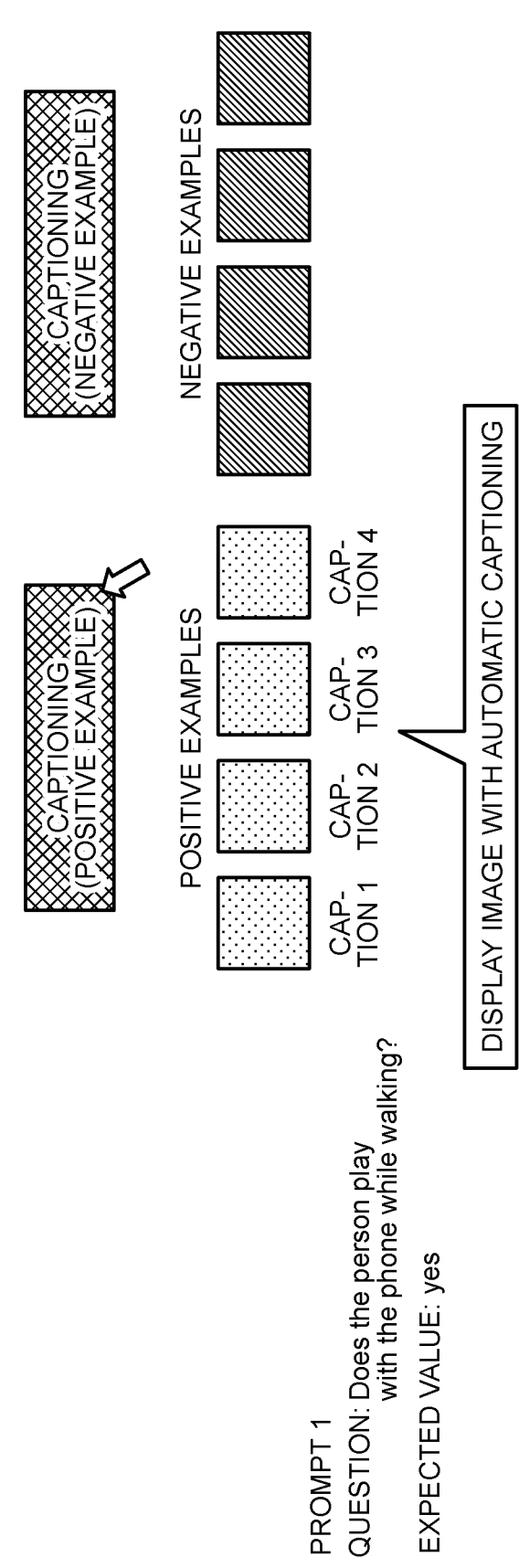
FIG. 21 is a diagram illustrating example display information according to the sixth embodiment.

FIG. 21 is a diagram illustrating an example of the display information according to the sixth embodiment. As illustrated in FIG. 21, by displaying the text (Captions 1 to 4) describing each image, the user can create or improve the prompt with reference to the Captions 1 to 4.

As described above, the sixth embodiment can support work of creating or improving a more appropriate prompt for detection of an image for a sample image set or the like.

Seventh Embodiment

Next, a seventh embodiment will be described. In the description of the seventh embodiment, description similar to that of the first embodiment is omitted, and points differing from those of the first embodiment are described. In the seventh embodiment, an additional training function used when the prompt improvement alone cannot provide successful handling is described. Note that, in the seventh embodiment, a case where the task of an AI processing module 12 is a VQA task; however, the same applies to other tasks.

Example Functional Configuration

Figure 22:
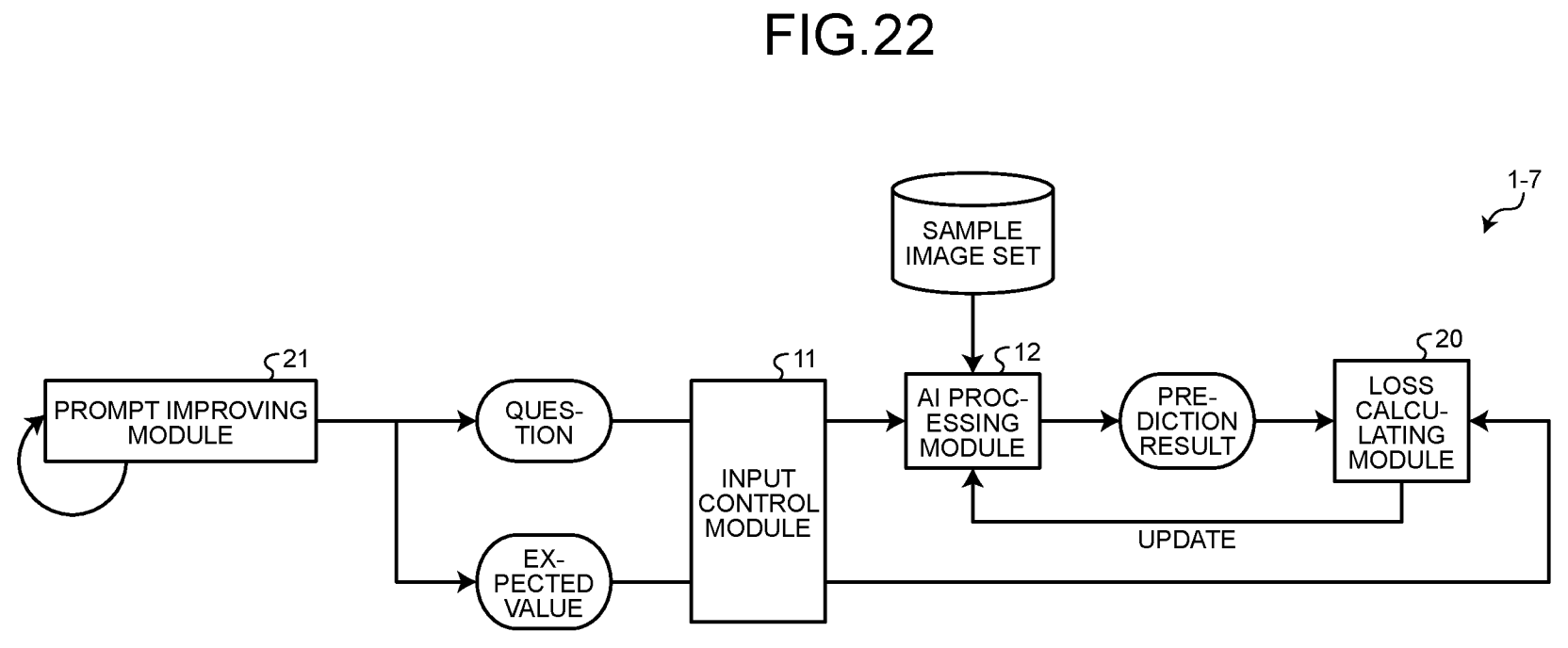

FIG. 22 is a diagram illustrating an example functional configuration of an information processing device 1-7 according to the seventh embodiment. The information processing device 1-7 of the seventh embodiment includes the input control module 11, the AI processing module 12, and a loss calculating module 20. Note that, to simplify the description, the example in FIG. 22 illustrates the function relating to the additional training and illustrates the functions to support the prompt improvement (the computing module 13 and the like) described in the first to fourth embodiments collectively as a prompt improving module 21.

The input control module 11 inputs a question input by the user to the AI processing module 12 and inputs an expected value input by the user to the loss calculating module 20.

The AI processing module 12 inputs the question and a sample image set to the AI model and inputs a result of prediction output from the AI model to the loss calculating module 20.

The loss calculating module 20 calculates a loss with a preset loss function from the result of prediction (answer) input from the AI processing module 12 and the expected value input from the input control module 11. The loss calculating module 20 updates the AI model by error-back-propagating the obtained loss. As the loss function, any loss function, such as cross-entropy, is used.

As described above, the seventh embodiment can provide the additional training function of the AI model when the prompt improvement alone cannot provide successful handling.

Lastly, an example hardware configuration of the information processing devices 1 (1-2 to 1-7) of the first to seventh embodiments will be described.

Example Hardware Configuration

Figure 23:
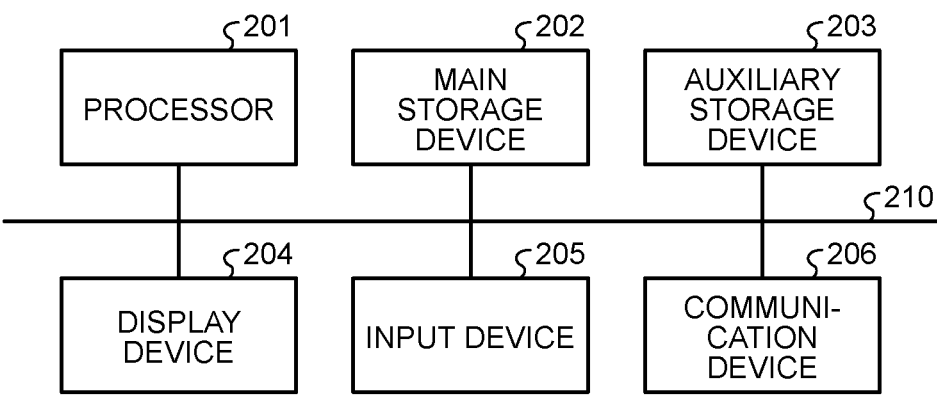
FIG. 23 is a diagram illustrating an example hardware configuration of the information processing devices according to the first to seventh embodiments.

FIG. 23 is a diagram illustrating an example hardware configuration of the information processing devices 1 (1-2 to 1-7) according to the first to seventh embodiments. The information processing device 1 includes a processor 201, a main storage device 202, an auxiliary storage device 203, a display device 204, an input device 205, and a communication device 206. The processor 201, the main storage device 202, the auxiliary storage device 203, the display device 204, the input device 205, and the communication device 206 are connected via a bus 210.

Note that the information processing device 1 may not include part of the above-described configuration. For example, if the information processing device 1 can use an input function and a display function of an external device, the information processing device 1 may not include the display device 204 and the input device 205.

The processor 201 executes a computer program read from the auxiliary storage device 203 into the main storage device 202. The main storage device 202 is a memory such as a read only memory (ROM) and a random access memory (RAM). The auxiliary storage device 203 is a hard disk drive (HDD), a memory card, or the like.

The display device 204 is, for example, a liquid crystal display or the like. The input device 205 is an interface for operating the information processing device 1. Note that the display device 204 and the input device 205 may be implemented as a touch panel or the like having a display function and an input function. The communication device 206 is an interface for communicating with another apparatus.

For example, the computer program executed by the information processing device 1 is provided as a computer program product recorded as an installable or executable file in a computer-readable storage medium, such as a memory card, a hard disk, a CD-RW, a CD-ROM, a CD-R, a DVD-RAM, and a DVD-R.

Alternatively, for example, the computer program executed by the information processing device 1 may be configured to be stored in a computer connected to a network, such as the Internet, and to be provided through downloading via the network.

Alternatively, for example, the computer program executed by the information processing device 1 may be configured to be provided via a network, such as the Internet, without downloading. In specific, the computer program may be configured using, for example, an application service provider (ASP) type cloud service.

Alternatively, for example, the computer program of the information processing device 1 may be configured to be provided while being preliminarily incorporated into a ROM or the like.

The computer program executed by the information processing device 1 has a module configuration including functions that can also be implemented by the computer program in the above-described functional configurations. Regarding each of the functions, as actual hardware, the processor 201 reads and executes the computer program from a storage media, and thus each functional block is loaded onto the main storage device 202. That is, each functional block is generated on the main storage device 202.

Note that some or all of the above-described functions may be implemented by hardware, such as an integrated circuit (IC), without using software.

Each function may be implemented using a plurality of the processors 201. In that case, each processor 201 may implement one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory storing an artificial intelligence (AI) model configured to output an answer based on input of (i) a text comprising a question and (ii) an image, the AI model being trained using a dataset including an image group and a question group associated with the image group; and
at least one hardware processor operably coupled to the memory and configured to execute processes comprising:
receiving input of a prompt including a first text and an expected value of an answer related to the first text;
predicting, upon input of the first text and at least one image, the answer for each of the at least one image by using the AI model;
calculating an accuracy of the answer from the expected value and the answer;
extracting K samples, from a sample image dataset storing therein, as a sample, the at least one image and a second text associated with the at least one image, in descending order of second similarity between the first text and the second text;
generating a suggested text based on the second text included in each of the K samples; and
controlling a display device to display information including at least the prompt, the answer, the accuracy, and the suggested text.

2. The device according to claim 1, wherein:
the processes further comprise receiving input of a plurality of images including at least one positive example image indicating a positive example and at least one negative example image indicating a negative example, and
the display information includes the answer for each of the at least one positive example image and the answer for each of the at least one negative example image.

3. The device according to claim 2, wherein;
the AI model is configured to carry out a visual question answering (VQA) task,
the first text includes a question for the plurality of images, and
the expected value of the answer includes a correct answer to the question.

4. The device according to claim 2, wherein:

the AI model is configured to carry out an image retrieval task retrieving an image having a specific feature, the first text includes a query for retrieving the image having the specific feature, and the expected value of the answer means that a first similarity to the image having the specific feature is greater than a threshold for the positive example image and is equal to or less than the threshold for the negative example image.

5. The device according to claim 1, wherein:

the AI model is configured to carry out a visual grounding task identifying a specific region, the first text includes a query for indicating the specific region, and the expected value of the answer includes a coordinate indicating a position of the specific region.

6. The device according to claim 1, wherein;

the processes further comprise visualizing a region of interest noted by the AI model for the at least one image according to a word contained in the first text, and the display information further includes information indicating the region of interest noted according to selection of the word, for each of the at least one image.

7. The device according to claim 1, wherein:

the processes further comprise, upon processing of the at least one image, visualizing a word of interest noted by the AI model among words contained in the first text, and the display information further includes information indicating the word of interest for each of the at least one image.

8. The device according to claim 1, wherein:

the processes further comprise retrieving the at least one image from a network based on the first text, and the display information further includes a button and the at least one image retrieved, the button being configured to command retrieval of the at least one image.

9. The device according to claim 1, wherein;

the processes further comprise generating a caption describing the at least one image, and the display information further includes the at least one image to which the caption is added.

10. The device according to claim 1, wherein the processes further comprise calculating a loss with a preset loss function from the answer output from the AI model and the expected value included in the prompt, and updating the AI model by error-back-propagating the loss.

11. An information processing device comprising:

a memory storing an artificial intelligence (AI) model configured to output an answer based on input of (i) a text comprising a question and (ii) an image, the AI model being trained using a dataset including an image group and a question group associated with the image group; and at least one hardware processor operably coupled to the memory and configured to execute processes comprising:

receiving input of a prompt including a first text and an expected value of an answer related to the first text;

predicting, upon input of the first text and at least one image, the answer for each of the at least one image by using the AI model;

calculating an accuracy of the answer from the expected value and the answer;

extracting K samples, from a prompt dataset storing therein, as a sample, the at least one image and a second text associated with the at least one image, in descending order of second similarity between the first text and the second text;

calculating a third similarity between the first text and the prompt dataset based on the second similarity of each of the K samples; and controlling a display device to display information including at least the prompt, the answer, the accuracy, and the third similarity.

12. A non-transitory computer-readable storage medium storing a program thereon, the program being executable by at least one hardware processor operably coupled to a memory storing an artificial intelligence (AI) model configured to output an answer based on input of (i) a text comprising a question and (ii) an image, the AI model being trained using a dataset including an image group and a question group associated with the image group, and the program being executable to control the at least one hardware processor to execute processes comprising:

receiving input of a prompt including a first text and an expected value of an answer related to the first text;

predicting, upon input of the first text and at least one image, the answer for each of the at least one image by using the AI model;

calculating an accuracy of the answer from the expected value and the answer;

extracting K samples, from a sample image dataset storing therein, as a sample, the at least one image and a second text associated with the at least one image, in descending order of second similarity between the first text and the second text;

generating a suggested text based on the second text included in each of the K samples; and controlling a display device to display information including at least the prompt, the answer, the accuracy, and the suggested text.

13. An information processing method executed under control of at least one hardware processor of an information processing device, the at least one hardware processor being operably coupled to a memory storing an artificial intelligence (AI) model configured to output an answer based on input of (i) a text comprising a question and (ii) an image, the AI model being trained using a dataset including an image group and a question group associated with the image group, and the method comprising:

receiving input of a prompt including a first text and an expected value of an answer related to the first text;

predicting, upon input of the first text and at least one image, the answer for each of the at least one image by using the AI model;

calculating an accuracy of the answer from the expected value and the answer;

extracting K samples, from a sample image dataset storing therein, as a sample, the at least one image and a second text associated with the at least one image, in descending order of second similarity between the first text and the second text;

generating a suggested text based on the second text included in each of the K samples; and controlling a display device to display information including at least the prompt, the answer, the accuracy, and the suggested text.

14. A non-transitory computer-readable storage medium storing a program thereon, the program being executable by at least one hardware processor operably coupled to a memory storing an artificial intelligence (AI) model configured to output an answer based on input of (i) a text comprising a question and (ii) an image, the AI model being trained using a dataset including an image group and a question group associated with the image group, and the program being executable to control the at least one hardware processor to execute processes comprising:

receiving input of a prompt including a first text and an expected value of an answer related to the first text;

predicting, upon input of the first text and at least one image, the answer for each of the at least one image by using the AI model;

calculating an accuracy of the answer from the expected value and the answer;

extracting K samples, from a prompt dataset storing therein, as a sample, the at least one image and a second text associated with the at least one image, in descending order of second similarity between the first text and the second text;

calculating a third similarity between the first text and the prompt dataset based on the second similarity of each of the K samples; and controlling a display device to display information including at least the prompt, the answer, the accuracy, and the third similarity.

15. An information processing method executed under control of at least one hardware processor of an information processing device, the at least one hardware processor being operably coupled to a memory storing an artificial intelligence (AI) model configured to output an answer based on input of (i) a text comprising a question and (ii) an image, the AI model being trained using a dataset including an image group and a question group associated with the image group, and the method comprising:

receiving input of a prompt including a first text and an expected value of an answer related to the first text;

predicting, upon input of the first text and at least one image, the answer for each of the at least one image by using the AI model;

calculating an accuracy of the answer from the expected value and the answer;

extracting K samples, from a prompt dataset storing therein, as a sample, the at least one image and a second text associated with the at least one image, in descending order of second similarity between the first text and the second text;

calculating a third similarity between the first text and the prompt dataset based on the second similarity of each of the K samples; and controlling a display device to display information including at least the prompt, the answer, the accuracy, and the third similarity.

\* \* \* \* \*